United States Patent

[11] 3,551,679

| [72] | Inventors | Charles J. Peters<br>Wayland;<br>William J. Rattman, Needham, Mass. |
|---|---|---|
| [21] | Appl. No. | 671,258 |
| [22] | Filed | Sept. 28, 1967 |
| [45] | Patented | Dec. 29, 1970 |
| [73] | Assignee | Sylvania Electric Products, Inc.<br>a corporation of Delaware |

[54] LOW DRIVE POWER WIDEBAND OPTICAL MODULATOR
7 Claims, 6 Drawing Figs.

| [52] | U.S. Cl. | 250/199, 332/7.51, 350/160 |
|---|---|---|
| [51] | Int. Cl. | H04b 9/00 |
| [50] | Field of Search | 250/199; 332/7.51; 350/150, 151, 160, 161 |

[56] References Cited
UNITED STATES PATENTS

| 3,304,428 | 2/1967 | Peters | 250/199 |
|---|---|---|---|
| 3,313,938 | 4/1967 | Peters | 250/199 |
| 3,426,207 | 2/1969 | Fried et al. | 250/199 |
| 3,360,324 | 12/1967 | Hora | 350/160 |
| 3,435,228 | 3/1969 | Gordon | 332/7.51X |
| 3,457,425 | 7/1969 | Preston, Jr. | 350/161X |

*Primary Examiner*—Robert L. Griffin
*Assistant Examiner*—R. S. Bell
*Attorneys*—Norman J. O'Malley and Elmer J. Nealon

ABSTRACT: A wideband optical modulator operable with very low drive power and including electro-optic crystals of small height disposed between the electrodes of a thermally stable, low capacitance transmission line structure, and a beam condenser to reduce the diameter of an input light beam.

PATENTED DEC29 1970  3,551,679

INVENTORS.
CHARLES J. PETERS
and WILLIAM J. RATTMAN
BY Elmer J. Nealon
ATTORNEY.

INVENTORS.
CHARLES J. PETERS and
WILLIAM J. RATTMAN
BY Elmer J. Nealon
ATTORNEY.

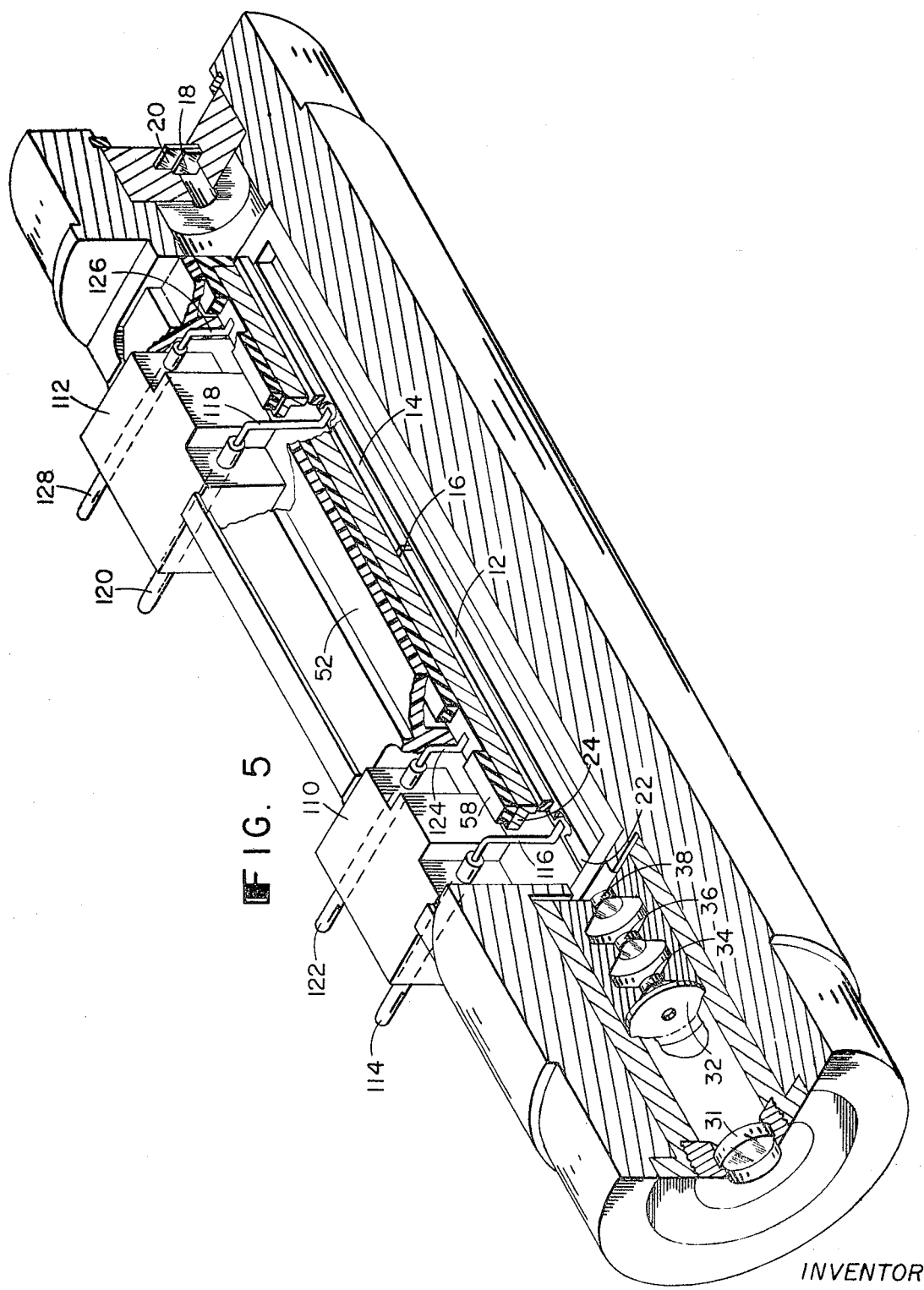

3,551,679

LOW DRIVE POWER WIDEBAND OPTICAL MODULATOR

BACKGROUND OF THE INVENTION

This invention relates to optical modulators and more particularly to low drive power wideband frequency, phase, polarization and amplitude modulators.

In U.S. Pats. Nos. 3,313,938 and 3,304,428, assigned to the same assignee as the present invention, light modulators are described which employ a travelling wave structure with suitably oriented electro-optical crystals to provide wideband operation. A phase modulator is described in U.S. Pat. No. 3,313,938 and comprises an electro-optical crystal positioned between a travelling wave structure such as a parallel plate transmission line and oriented such that the modulation potential is applied along the crystal axis. The travelling wave structure is designed to provide equality between the velocity of the light through the crystal and the velocity of a modulation signal through the crystal to thereby achieve wideband operation. A coherent light beam to be modulated is transmitted along the length of the transmission line with its electric vector oriented along the crystal axis. The index of refraction along the axis varies by virtue of the modulation signal thereby causing phase modulation of the light beam.

As taught in U.S. Pat. No. 3,304,428, similar light modulation apparatus can be used to provide wideband amplitude modulation. Again, the modulation potential is applied along the crystal axis; however, the incident light beam is oriented with its electric vector intermediate to the crystal axes, typically at 45° to the axis. The index of refraction along the direction varies with the applied modulating potential casing the component of the incident light parallel to the direction to be phase modulated in accordance with the modulating signal. The index of refraction along the axis is substantially independent of the applied modulating field, consequently, the incident light component parallel to this direction remains unmodulated. Amplitude modulation is achieved by providing a linear polarizer at the output of the device with its axis collinear with the axis of the incident light beam. Since this polarizer is responsive only to the resultant of the modulated and unmodulated components of the incident light, a linearly polarized output beam of variable amplitude results.

SUMMARY OF THE INVENTION

In accordance with the present invention, a modulator generally of the type disclosed in the above-identified patents is provided which achieves extremely wide operating bandwidths with rather modest drive power. Briefly, an electro-optic material having a large aspect (length-to-height) ratio is disposed in light transmitting relationship between a pair of electrodes shaped and designed to provide thermal stability throughout the length of the electro-optic material as well as providing a low capacitance structure necessary for wide bandwidth low drive power operation. In addition, a light beam condenser is employed in light transmitting relationship with the electro-optic material to reduce the diameter of an input light beam prior to transmission through the material to allow the use of electro-optic elements of small cross-sectional area.

DESCRIPTION OF THE DRAWINGS

The construction and operation of the invention will be more fully understood from the following detailed description taken in conjunction with the accompanying drawings in which:

FIG. 5 is a partly cut away pictorial representation of another embodiment of the invention.

DETAILED DESCRIPTION OF THE INVENTION

Figure 1:
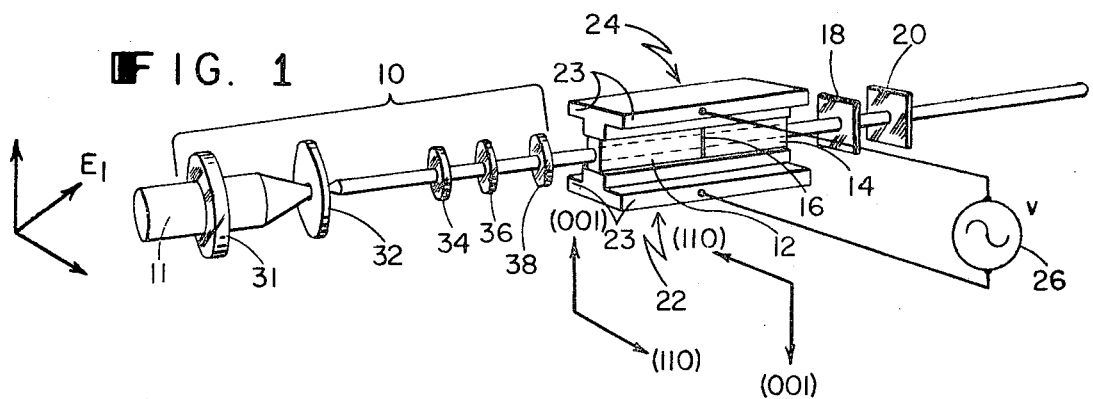
FIG. 1 is a diagrammatic representation of a light modulator embodying the invention.

An amplitude light modulator according to the invention is illustrated diagrammatically in FIG. 1 and includes, in light transmitting relationship; a beam condenser 10, a pair of electro-optic crystals 12 and 14 disposed with their respective optical axes 180° apart and with a 90° rotator 16 disposed therebetween, a retardation plate 18 and an analyzer 20. The crystals have a high aspect (length-to-height) ratio and typically are potassium dihydrogen phosphate (KDP). The crystals are disposed between and in contact with a pair of specially shaped electrodes or transmission lines 22 and 24, to be discussed in detail hereinafter, to which a modulation signal is applied from a modulation source 26.

The beam condenser 10 comprises a focusing lens 31, typically a duoconvex lens, a field stop 32 located at the focal plane of lens 31, typically a disc with a small opening at the optical axis, and a standard short focal length compound lens system including lenses 34, 36 and 38 which are typically duoconvex lens. In operation, the beam of light enters lens 31 and is focused at the opening of the field stop 32 which reduces the transmission of off-axis rays. The beam is then reformed by the compound lens system wherein lens 38 provides the primary short focal length and lens 34 and 36 provide corrections for spherical aberration, astigmatism, field curvature and distortion. Typical focal lengths for lens 31 and lens combination 34, 36 and 38 are 25 mm and 4 mm, respectively, this lens system being operative to reduce the diameter of an input light beam by a factor of about six.

The operation of the modulator is described in detail in the above-referenced U.S. Pat. No. 3,304,428, and will be discussed herein only to the extent necessary in understanding the present invention. Light passing through the crystals receives a retardation which is due to the applied modulation field and to the natural birefringence of the crystals. Crystal 14 is oriented with its optical axes effectively orthogonal to the axes of crystal 12 to cancel the natural birefringence and to impart an additional modulation to the light. The natural birefringence of the two crystals is of identical sign, causing cancellation of the natural birefringence, while the modulation retardation in the two crystals is of opposite sign, causing addition of the modulation components. Amplitude modulation is achieved, for example, by passing the light through a quarter wave plate 18 and a polarizer 20 disposed with its axis coincident with the electric vector of the incident light.

In accordance with the invention, the electrodes 22 and 24 and crystals 12 and 14 are designed and dimensioned to provide a low capacitance transmission line structure which allows wide bandwidth operation with low drive power.

The modulator drive power can be expressed by the following equation:

$$P = \frac{M^2 b^2 2\pi f \, c}{l^2} \qquad (1)$$

where $M =$ the half wave retardation voltage for the crystal materials divided by $2\sqrt{2}$ $b =$ the height of the crystals between the energizing electrodes;
$f =$ the bandwidth over which the modulator is to be operated;
$c =$ the capacitance of the modulator structure;
$l =$ length of the crystals in contact with the electrodes.

As seen from equation 1, the required modulation drive power is proportional to the square of the crystal height $b$, the operating bandwidth $f$ and the capacitance $c$. Inspection of the equation should also reveal that the operating bandwidth of the modulator is inversely proportional to the capacitance of the modulator structure for a fixed power. To provide increased bandwidth and decreased drive power, therefore, the capacitance and the height of the crystals should be reduced. However, in practice, the decrease in crystal height for a given modulator structure is accompanied by an increase in capacitance. Furthermore, the amount of decrease in crystal height is limited by the cross-sectional area of an input light beam since for proper modulation the light beam should be sufficiently small to be contained within the cross-sectional area of the crystals. The design of the modulator is, therefore, a compromise between competing requirements, which requirements are balanced by the judicious modulator structure described hereinbelow.

The electrodes which provide the intended performance are T-shaped in cross section, as seen in FIG. 1, and are formed from a conductive material such as copper. The portion of the electrodes in contact with the electro-optic crystals have sufficient mass to provide thermal symmetry and stability, while the overhanging portion 23 of the electrodes minimizes the capacitance of the travelling wave structure. The cross-sectional area of the crystal is smaller than can be employed in conventional optical modulators by employment of beam condenser 10. By action of the beam condenser, the diameter of the applied light beam is reduced so that the light beam lies entirely within the cross-sectional area of the crystals.

Figure 2:
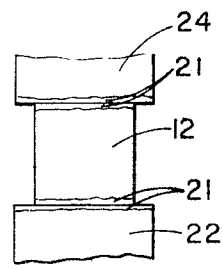
FIG. 2 is a greatly exaggerated view of the electrode/crystal contacting surfaces.

Electrodes 22 and 24 are made of copper which while having favorable electrical and thermal properties has a relatively irregular surface, as illustrated in a greatly exaggerated manner in FIG. 2. A thin plated layer 21 of, typically, silver or gold is formed on the contacting surfaces of the electrodes and crystals to insure good electrical contact over the full crystal surface without excessive pressure, and to eliminate minute volumes of air entrapped by the granularity of the electrode and crystal surfaces. Such entrapped air, if not eliminated, can cause dissipation of a portion of the applied drive power and can also cause uneven modulation over the full crystal length. In FIG. 2, the plated layers 21 are seen on the confronting surfaces of electrodes 22 and 24 and on the surface of crystal 12 in contact with the electrodes. Plated layers are also provided, similarly, on crystal 14.

Figure 3:
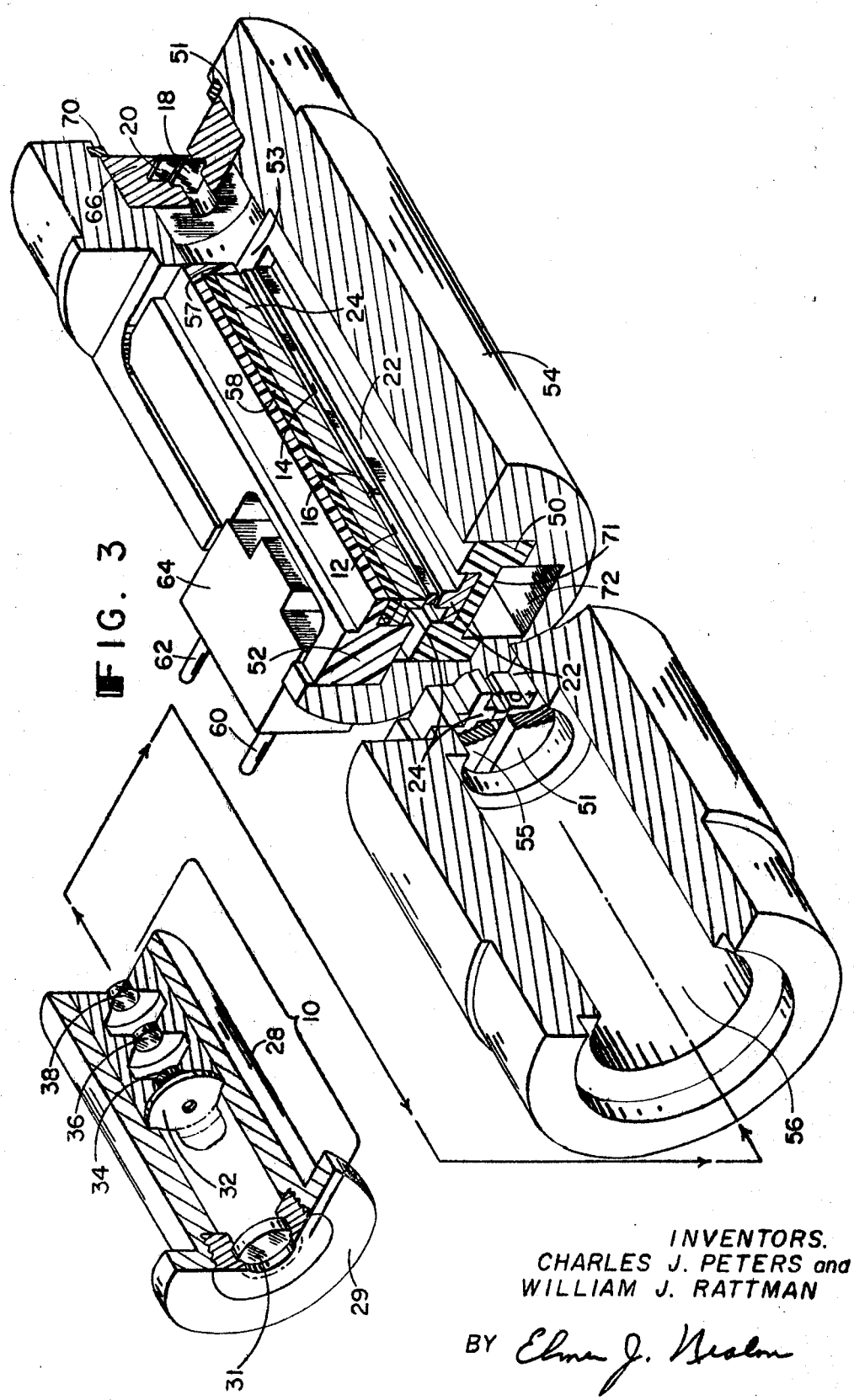
FIG. 3 is a partly cut away pictorial representation of a preferred embodiment of the invention.

The coaxial structure of FIG. 3 houses a modulator of the type shown in FIG. 1. The cylindrical structure includes a massive metal cylinder 54, formed for example of aluminum, having a circular opening 56 therein which extends coaxially throughout the front portion of the cylinder, a stepped channel 72 extending along the length of the center section of the cylinder, and a circular opening 51 in the rear section of the cylinder 54. The beam condenser 10 is secured within circular opening 56 and comprises a hollow cylindrical housing 28, with a flange 29 on the front portion thereof. A lens 31, field stop disc 32, and lenses 34, 36 and 38 are mounted by well known means such as lens holders 39 in light transmitting relationship within housing 28.

Two insulators 50 and 52, formed for example from plastic, are dimensioned to be accommodated within the two larger channels of cylinder 54. These insulators are I-shaped in cross section with rectangular end portions defining rectangular troughs extending along the length of the insulators. Insulator 50 has end portions 51 and 53, while insulator 52 has end portions 55 and 57. Trough 71 of insulator 50 is dimensioned to align with channel 72 of housing 54. Each insulator has a channel confronting the other to contain a respective electrode. Electrode 22 is disposed within the upper channel of insulator 50, and electrode 24 is disposed within the lower channel of insulator 52. A strip 58 of shock absorbent material such as rubber is located between the crossmember of electrode 24 and the top surface of the lower channel of insulator 52, this strip being operative to isolate or reduce mechanical shocks which may, in the absence of such shock absorption, adversely affect proper modulator operation. The birefringent crystals 12 and 14 together with rotator 16 are disposed between the T-shaped electrodes 22 and 24. As discussed hereinabove, the contacting surfaces of the crystals and the electrodes are plated to minimize the contact resistance and thus reduce the required drive power. The two electrodes are electrically isolated from cylinder 54 by respective insulators 50 and 52 to provide a relatively low input capacitance. Capacitance between the electrode structure and cylinder 54 is reduced by the stepped channel construction of cylinder 54.

Figure 4B:
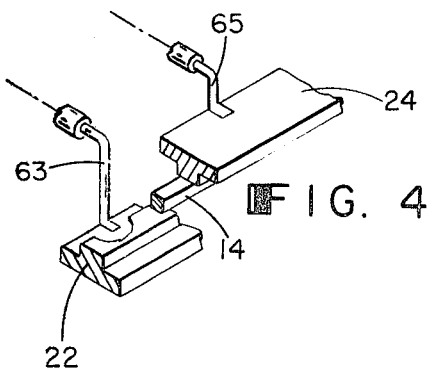
FIGS. 4A and 4B are partly cut away pictorial representations of the modulator of FIG. 3 illustrating the terminal connections.
Figure 4A:
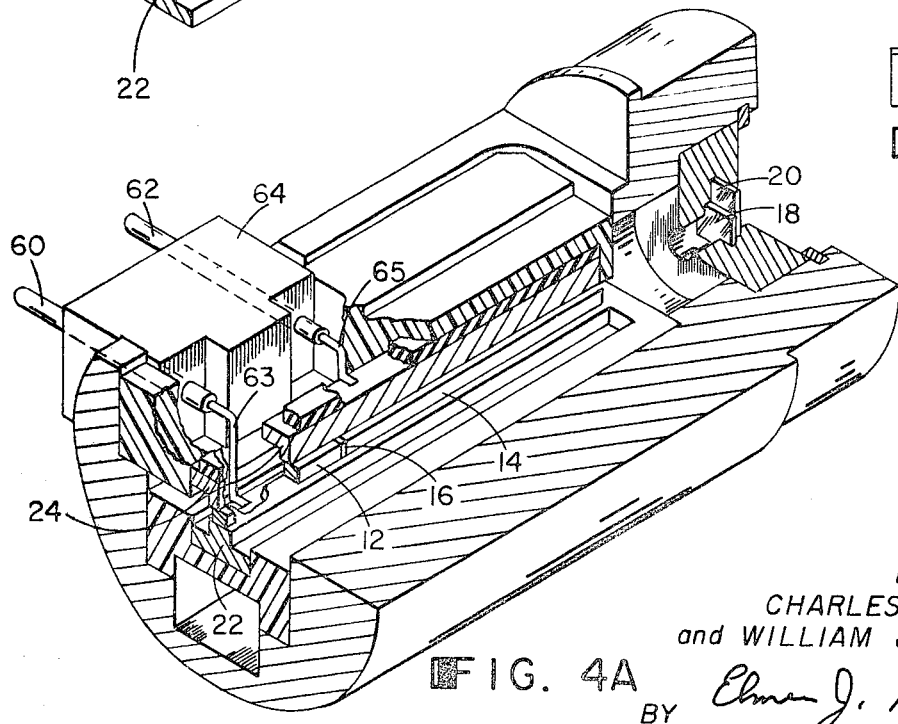

A modulating signal is applied to the modulator via connector 64. Referring to FIG. 4A, pin 60 of connector 64 is connected to electrode 22 by means of wire 63, and pin 62 is connected to electrode 24 by means of wire 65. As seen more clearly in FIG. 4B, connection to the electrodes is made by soldering or otherwise affixing wires 63 and 65 in slots provided in respective electrodes 22 and 24. Although a balanced connector 64 is illustrated in the present embodiment, a coaxial or other well known connector can also be employed.

Quarter wave plate 18 and polarizer 20 are mounted in light transmitting relationship with crystals 12 and 14 by means of a mounting ring 66 secured within opening 51, for example, by a retaining ring 70.

The modulator illustrated in FIGS. 1 and 3 operates in the resonant mode wherein the electrode structure supports a standing wave pattern. The same modulator is also operative in the travelling wave mode by suitably energizing the electrodes as in FIG. 5. This embodiment is identical to the earlier described modulator, except that two connectors 110 and 112 are connected to respective ends of the electrodes. The input connection to electrode 22 is made via pin 114 of connector 110 and conductor 116, while the output connection is made via conductor 118 and pin 120 of connector 112. The input connection to electrode 24 is made via pin 122 of connector 110 and conductor 124, while the output connection is made via conductor 126 and pin 128 of connector 112. A modulating signal is applied via pins 114 and 122 of connector 110, travels down the transmission line electrodes 22 and 24 and is terminated in a suitable load connected to pins 120 and 128 of the output connector 112.

The embodiments shown and described herein are amplitude modulators. These same modulator structures can also be employed as phase modulators by removing the wave plate 16, the retardation plate 18 and the polarizer 20 and be reorienting crystal 14 such that its crystal axes coincide with the axes of crystal 12. (A single crystal could be employed in this instance, but since crystals with the desired aspect ratio are not commercially available, in practice a plurality of crystals are employed, arranged end to end with their axes in alignment.) The particular modulator configuration shown herein is not optimized for phase modulation, as the thermal stability required in phase modulation is not as stringent as that required for amplitude modulation, and some of the design features of the present modulator are, therefore, less important in the case of phase modulation. However, the present design permits the use of a uniform housing for both phase and amplitude modulators, thereby permitting the manufacture and stocking of fewer parts in fabricating both phase and amplitude modulators.

While a number of modifications of the modulator have been suggested, it will be apparent that many variations may be made by ones skilled in the art without departing from the spirit of the invention. It is, therefore, intended that the invention not be limited to specifics of the foregoing description, but rather to embrace the full scope of the following claims.

We claim:
1. A low power wideband light modulator comprising:
a thermally symmetrical low capacitance transmission line structure including an elongated electro-optic material as part of the dielectric thereof and first and second T-shaped electrodes each having a first portion and a cross-portion, one of said electrodes being inverted such that said electro-optic material is disposed between and in contact with the first portion of said first and second electrodes, said transmission line structure being operative to apply a modulating potential to said electro-optic materi- al in a direction orthogonal to the elongated axis thereof; and a beam condenser disposed in light transmitting relationship with said electro-optic material and being operative to reduce the diameter of a first light beam entering said beam condenser to a second light beam having a smaller diameter of parallel rays such that the second light beam lies entirely within the cross-sectional area of said electro-optic material.

2. The invention according to claim 1 wherein said transmission line structure includes first and second T-shaped electrodes, having confronting areas substantially coextensive and in electrical contact with said electro-optic material.

3. The invention according to claim 1 wherein said transmission line structure includes first and second T-shaped electrodes, each having a crossmember of greater area than a member depending therefrom, said electrodes being arranged in confronting relationship with their crossmembers parallel and said depending member in a common plane, the confronting surfaces of said depending members being substantially coextensive and in electrical contact with said electro-optic material.

4. The invention according to claim 1 wherein said housing is cylindrical and has a coaxial opening in the front portion thereof containing said beam condenser and a central portion having a stepped channel containing said transmission line structure.

5. The invention according to claim 4 further including insulator means disposed in the opening of said central portion between said housing and said transmission line structure and operative to thermally and electrically insulate said transmission line structure from said housing.

6. The invention according to claim 5 wherein said insulator means includes: first and second insulators each having an I-shaped cross section with rectangular end portions defining a trough along the length of said insulator, said insulators being disposed with their troughs confronting one other and containing said transmission line structure.

7. The invention according to claim 4 further including a shock isolator interdisposed between one side of said transmission line structure and said first insulator means and operative to damp acoustic shock waves.